United States Patent Office 2,875,172
Patented Feb. 24, 1959

2,875,172
PROCESS FOR COMPOUNDING ALKYL ARYL VINYL SILICONE ELASTOMER WITH FILLER AND SILANEDIOL, AND PRODUCT OBTAINED THEREBY

Joseph C. Caprino, Schenectady, N. Y., assignor to General Electric Company, a corporation of New York No Drawing. Application November 1, 1956
Serial No. 619,675

5 Claims. (Cl. 260—37)

My invention relates to improved alkyl aryl vinyl silicone elastomeric compositions. More particularly, the invention relates to such compositions which are characterized by improved physical characteristics and to the process of making them.

Modified organopolysiloxanes filled with silica type fillers of very high surface area convertible to the cured, elastomeric state are well known in the art as are such materials containing vinyl groups. However, while such materials have been eminently useful in many applications, there is a requirement for materials of this type which have improved physical characteristics which makes them more suitable for gaskets, tubing, insulation, shock absorbers and the like which are severely treated in a mechanical sense.

An object of the invention is to provide alkyl aryl vinyl silicone elastomers which have superior physical characteristics.

Another object is to provide methods for producing such materials.

Briefly stated, my invention comprises alkyl aryl vinyl silicone base elastomers and their production by subjecting the silicone composition to a shearing and smearing or wiping mixing action as in a doughmixer or Banbury mixer at elevated temperatures during the addition of filler material. Alternatively, of course, the filler can be compounded with the silicone and the mixture then treated as above.

Those features of my invention which I believe to be novel are set forth in the claims appended hereto. My invention will, however, be better understood and further objects made apparent from a consideration of the following description.

The alkyl aryl vinyl silicone elastomer compositions of the invention are derived in well known manners from various organosiloxanes having a ratio of about from 1.98 to 2.05 organic groups per silicon atom. While preferably the alkyl group is methyl, it may be other lower alkyl groups, e. g., ethyl, propyl, etc. Likewise, the aryl group may also be, besides phenyl, xylyl, benzyl, tolyl, chlorophenyl, etc. Although I prefer for convenience and availability of material to prepare my alkyl aryl vinyl silicone material from various tetramers, I can as well prepare them from trimers, pentamers, hexamers and the like.

Generally, the aryl group comprises from about 2% to 20%, the vinyl group from about 0.05 to 2%, and the alkyl group from about 78 to 98% by weight of the total organic groups.

The methyl phenyl vinyl gum, as pointed out above, may be made in any of a number of ways and the following is exemplary only of such methods, all parts given being by weight. Octamethylcyclotetrasiloxane in the amount of 100 parts is mixed with 15 parts of octaphenylcyclotetrasiloxane, heated to about 130° C., and thereafter 0.23 part 1,3,5,7-tetramethyl-1,3,5,7-tetravinylcyclotetrasiloxane is added to the mixture with about 0.01 percent, by weight KOH, based on the total weight of the organopolysiloxanes, and the mixture heated for about 5 hours with stirring at 165° C. to 175° C. The KOH is neutralized with trichloroethylphosphite at 175° C. and devolatilized to produce the methyl phenyl vinyl silicone containing an average of about two organic groups to each silicon atom.

It will be realized, of course, that the various constituents described above may be varied in amount to give varying characteristics. Thus, the octaphenylcyclotetrasiloxane can be varied from 2 to 20%, the 1,3,5,7-tetramethyl-1,3,5,7-tetravinylcyclotetrasiloxane from 0.05 to 2.0%, and the potassium hydroxide from 0.0005 to 0.03%. The temperature at which reaction is carried out can be varied, e. g., from 140° C. to about 180° C., and the time of reaction from about 1½ to 5 hours, depending on the temperature, ingredients used, type of product desired, etc.

As pointed out above, it has been found that when alkyl aryl vinyl silicone polymers filled with finely divided silica type fillers, such as there set forth in Patent 2,541,137 and the like, the elastomeric products resulting therefrom are, while useful for many purposes, limited in their range of usefulness by reason of their strength and physical characteristics generally. It has now been found unexpectedly that with such materials, mixing in a doughmixer, Banbury or equivalent mixer at elevated temperatures remarkably enhances the physicals of the resultant elastomer.

The following examples are given to illustrate the advantages of the invention and are not to be taken as limiting in any way. All parts are by weight.

EXAMPLE 1

Methyl phenyl vinyl polymer as described above was placed in the amount of 100 parts on a two-roll rubber mill of the usual type along with 4 parts of diphenylsilanediol. There was added to the above with the mill in operation 40 parts of finely divided silica over a period of about two and one-half hours to ensure smooth and complete blending of the filler with the polymer mix. The compounded material was allowed to cool to room temperature and 1 part of bis-(2,4-dichlorobenzoyl) peroxide added while mixing on a rubber mill.

All examples herein were press cured between steel plates 10 minutes at 120° C. When further cured in an open air oven at the temperatures indicated in Table I, the physical properties were as shown therein.

EXAMPLE 2

Example 1 was repeated except that the material was doughmixed at 150° C. instead of being milled, the curing agent being, as before, added after cooling on a rubber mill. When molded in the form of flat sheets at a temperature of about 120° C. for 10 minutes and oven cured as shown in Table I, the listed physical properties were obtained.

Table I

| Example | 1 | 2 |
|---|---|---|
| Condition | Milled | Dough-mixed at 150° C. |
| Oven Cure: 1 hour at 150° C.: | | |
| Shore A hardness | 58 | 56 |
| Tensile strength (p. s. i.) | 1,220 | 1,865 |
| Elongation (percent) | 520 | 730 |
| Tear (p./i.) | 180 | 245 |
| Oven cure: 24 hours at 250° C.: | | |
| Shore A hardness | 70 | 70 |
| Tensile strength (p. s. i.) | 575 | 520 |
| Elongation (percent) | 230 | 180 |
| Tear (p./i.) | 80 | 80 |
| Compression set (percent) (22 hours at 177° C.) | 36 | 37 |
| Knit time (seconds): | | |
| 3 days aging | 145 | 31 |
| 14 days aging | 155 | 139 |

It will be noted that the physical properties of the material doughmixed and heat treated at 150° C. are decidedly superior to those which were merely mill mixed. The doughmixed and heated material is also preferable from the point of view of processing because of its decidedly reduced knit time.

The knit time was measured as follows: A two-roll differential laboratory mill 3" x 8" was employed in which the speed ratio was 1.4 to 1 and the faster roll revolved at a speed of 60 revolutions per minute. The mill roll clearance was adjusted to pass a 12-mil thick soft solder slug at a temperature of about 70° to 90° F. In conducting the knit time test, 30 grams of the compound being tested were added to the nip of the roll in small pieces to permit passage therethrough. A preliminary pass was often required at a somewhat slightly wider setting to reduce the sample thickness. When all of the compound had passed through the nip once, timing by stop watch was begun. The compound was again added to the nip and, in order to keep the "bank" of the compound in motion, it was sometimes necessary to open the mill slightly for a brief interval and then return to the predetermined 12-mil adjustment. The timing was continued until the compound became plastic and completely covered the width of the faster roll in the form of a continuous solid film. This time was recorded as "knit time."

For the compression set test, discs were cut from the molded and heat-treated sheets, the discs being superimposed one upon the other until a cylinder ½" high was obtained. This cylinder or plug was then compressed to 75% of its thickness between steel plates for 22 hours at the indicated temperature, then cooled to room temperature and the pressure released. The thickness of the resulting plug was measured 30 minutes thereafter, with this thickness being taken as a measure of the compression set. A 100% compression set indicates no recovery, while a 0% compression set indicates that the plug returned to its original thickness after release of the pressure.

As to the time of mixing with a shearing and smearing or wiping action, experiments have shown that two hours of mixing in a doughmixer are equivalent to about 20 minutes of mixing in a Banbury type mixer. It has been found, in general, that doughmixing for over three hours does not improve the material sufficiently to warrant the extra mixing. However, doughmixing as specified for any time up to about 1½ to 3 hours results in improved physical properties.

A number of examples were run using different temperatures during the doughmixing, the composition and treatment being otherwise the same as in Example 2. Table II below shows the physical properties resulting from doughmixing at 25° C., 60° C., 150° C., and also the effect of mixing the ingredients at 65° C. followed by two hours mixing in the doughmixer at 150° C.

*Table II*

| Example | 3 | 4 | 5 | 2 |
|---|---|---|---|---|
| Temperature of doughmixing, ° C | 25 | 60 | 65 and ¹150 | 150 |
| Oven Cure: 1 hour at 150° C.: | | | | |
| Shore A hardness | 61 | 60 | 52 | 56 |
| Tensile strength (p. s. i.) | 1,600 | 1,545 | 1,725 | 1,865 |
| Elongation (percent) | 660 | 690 | 780 | 730 |
| Tear (p./i.) | 190 | 225 | 290 | 245 |
| Oven Cure: 24 hours at 250° C.: | | | | |
| Shore A hardness | 74 | 71 | 67 | 70 |
| Tensile strength (p. s. i.) | 520 | 410 | 520 | 520 |
| Elongation (percent) | 230 | 160 | 230 | 180 |
| Tear (p./i.) | 105 | 105 | 90 | 80 |
| Compression set (22 hours at 177° C.) | 73 | 70 | 40 | 37 |
| Knit time (seconds): | | | | |
| 3 days aging | 90 | 70 | 30 | 31 |
| 14 days aging | 200 | 165 | 139 | 139 |

¹ Mixed at 65° C. and then heated at 150° C. for 2 hours in doughmixer.

Comparison of Table II and Table I, particularly with respect to Example 1 of the latter, shows that even doughmixing at 25° C. as in Example 3 definitely improves the 150° C. cure physicals with the maximum benefits realized with doughmixing at 150° C. both as to physical properties and ease of processing or low knit times.

The present invention is specific to alkyl aryl vinyl silicones and this is made clear in Table III below. Examples 6 and 7, the physical properties for which are shown in the table, were composed of 100 parts of methyl vinyl polymer made as described above containing about 2 organic groups per silicon atom, 40 parts finely divided silica and 4 parts of diphenylsilanediol which were compounded in the case of Example 6 on a rubber mill, and in the case of Example 7 in a doughmixer at 150° C. The curing agent, one part of bis (2,4-dichlorobenzoyl) peroxide was added as in previous examples on a rubber mill.

*Table III*

| Example | 6 | 7 |
|---|---|---|
| Condition | Mill mixed | Dough-mixed at 150° C. |
| Oven Cure: 1 hour at 150° C.: | | |
| Shore A hardness | 61 | 65 |
| Tensile strength (p. s. i.) | 1,210 | 1,115 |
| Elongation (percent) | 390 | 370 |
| Tear (p./i.) | 115 | 140 |
| Oven cure: 24 hours at 250° C.: | | |
| Shore A hardness | 65 | 68 |
| Tensile strength (p. s. i.) | 830 | 540 |
| Elongation (percent) | 330 | 180 |
| Tear (p./i.) | 105 | 105 |
| Compression set (22 hours at 177° C.) | 21 | 23 |
| Knit time (seconds): | | |
| 3 days aging | 180 | >300 |
| 14 days aging | 210 | >300 |

From Table III it will be noted that, in general, the physical properties of the methyl vinyl polymer, treated in exactly the same manner as my alkyl phenyl vinyl polymer, were seriously degraded by doughmixing at 150° C. as compared to mixing on a rubber mill. Furthermore, the processing of the doughmixed and heated material becomes more difficult because of the enormous increase in knit time, when aged for only 3 days, from 180 seconds to over 300 seconds. Here, then, is a conclusive indication that the improvement is specific to an alkyl aryl vinyl silicone and not to vinyl silicones in general.

Further tests were carried out using 100 parts of a methyl phenyl silicone consisting of the copolymer of octamethylcyclotetrasiloxane and 15 weight percent octaphenylcyclotetrasiloxane along with 40 parts finely divided silica and 4 parts diphenylsilanediol. The copolymer was prepared as follows. The tetramers were mixed at a temperature of from 150° C. to 175° C. for about four hours with about .01% potassium hydroxide based on the weight of the tetramers until a highly viscous, gummy solid was obtained. The amount of octaphenylcyclotetrasiloxane can be varied up to 20 weight percent of the total mixture as desired. The cure agent was 1 part of bis(2,4-dichlorobenzoyl) peroxide. Shown in Table IV below under Example 8 are the re-

*Table IV*

| Example | 8 | 2 |
|---|---|---|
| Oven Cure: 1 hour at 150° C.: | | |
| Shore A hardness | 58 | 56 |
| Tensile strength (p. s. i.) | 1,210 | 1,865 |
| Elongation (percent) | 560 | 730 |
| Tear (p./i.) | 208 | 245 |
| Oven Cure: 24 hours at 250° C.: | | |
| Shore A hardness | 65 | 70 |
| Tensile strength (p. s. i.) | 369 | 520 |
| Elongation (percent) | 120 | 180 |
| Tear (p./i.) | 66 | 80 |
| Compression set (22 hours at 177° C.) | 42 | 37 |
| Knit time (seconds): | | |
| 3 days aging | 200 | 31 |
| 14 days aging | 305 | 139 | sults of doughmixing such a material at 150° C. for two and one-half hours. Also included in Table IV are the properties of Example 2 which is exactly similar to Example 8 except that methyl phenyl vinyl silicone was used instead of the methyl phenyl silicone.

From the above it will at once be seen that while a methyl phenyl silicone has desirable physical properties when doughmixed at elevated temperature, these properties are in no sense as high as those secured by similarly treating alkyl aryl vinyl silicone. The processing of the alkyl aryl vinyl silicone is likewise vastly improved as evidenced by its low knit time as compared with the alkyl aryl silicone.

Experiments were conducted to determine the effect of different amounts of diphenylsilanediol upon the physical properties of the alkyl aryl vinyl silicone and particularly with respect to knit time since the diol is known as a structure reducing material. Shown in Table V Table V

| Example | 9 | 10 | 11 | 2 | 12 | 13 |
|---|---|---|---|---|---|---|
| Parts diphenylsilanediol | 1 | 2 | 3 | 4 | 5 | 6 |
| Oven Cure: 1 hour at 150° C.: | | | | | | |
| Shore A hardness | 66 | 61 | 57 | 56 | 53 | 52 |
| Tensile strength (p. s. i.) | 1,060 | 1,280 | 1,710 | 1,865 | 1,810 | 1,850 |
| Elongation (percent) | 330 | 470 | 620 | 730 | 710 | 760 |
| Tear (p./i.) | 149 | 162 | 210 | 245 | 270 | 260 |
| Oven Cure: 24 hours at 250° C.: | | | | | | |
| Shore A hardness | 75 | 75 | 75 | 70 | 71 | 70 |
| Tensile strength (p. s. i.) | 490 | 600 | 570 | 520 | 520 | 625 |
| Elongation (percent) | 90 | 150 | 180 | 180 | 160 | 230 |
| Tear (p./i.) | 65 | 75 | 87 | 80 | 75 | 73 |
| Compression set (22 hours at 177° C.) | 50 | 31 | 39 | 37 | 32 | 28 |
| Knit time (seconds): | | | | | | |
| 3 days aging | 200 | 158 | 101 | 31 | 33 | 23 |
| 14 days aging | 420 | * | * | 139 | 116 | 98 | are the properties of materials similar to Example 2 except that the parts of diphenylsilanediol were varied as indicated.

It was unexpectedly discovered that the addition of dimethylcyclopinacoxysilane which has the structure

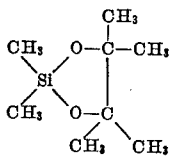

when used along with diphenylsilanediol produces a very desirable product. Using the composition of Example 2 with dimethylcyclopinacoxysilane added in the amounts shown in Table VI, the improvements in physical properties noted therein were obtained.

Table VI

| Example | 2 | 14 | 15 | 16 |
|---|---|---|---|---|
| Parts dimethylcyclopinacoxysilane | 0 | 2 | 4 | 6 |
| Oven Cure: 1 hour at 150° C.: | | | | |
| Shore A hardness | 56 | 53 | 52 | 50 |
| Tensile strength (p. s. i.) | 1,865 | 1,760 | 1,890 | 1,850 |
| Elongation (percent) | 730 | 680 | 700 | 700 |
| Tear (p./i.) | 245 | 255 | 215 | 290 |
| Oven Cure: 24 hours at 250° C.: | | | | |
| Shore A hardness | 70 | 66 | 69 | 65 |
| Tensile strength (p. s. i.) | 520 | 865 | 860 | 850 |
| Elongation (percent) | 180 | 300 | 290 | 300 |
| Tear (p./i.) | 80 | 100 | 115 | 110 |
| Compression set (22 hours at 177° C.) | 37 | 21 | 22 | 21 |
| Knit time (seconds): | | | | |
| 3 days aging | 31 | 54 | 35 | 21 |
| 14 days aging | 139 | 110 | 90 | 40 |

Comparing Examples 14, 15 and 16 with Example 2, which contains 4 parts of diphenylsilanediol but no dimethylcyclopinacoxysilane, it will be noted that with a final cure of one hour at 150° C. the additive in the amounts of four and six parts produces an improvement in the tensile strength and other physicals of the final elastomeric product. With a cure of 24 hours at 250° C., most of the physicals are improved with the addition of only 2 parts of dimethylcyclopinacoxysilane. Even more important, perhaps, the additive substantially reduces the knit time after aging so that processing of the material is made much easier.

Further experiments were carried out varying the amount of diphenylsilanediol as well as the amount of dimethylcyclopinacoxysilane using 140 parts of the methyl phenyl vinyl copolymer filled material of Example 2 and 1 part of bis(2,4-dichlorobenzoyl) peroxide. These examples are shown in Table VII below.

Table VII

| Example | 17 | 18 | 19 | 20 | 21 | 22 |
|---|---|---|---|---|---|---|
| Parts diphenylsilane diol | 0 | 0 | 0 | 2 | 2 | 2 |
| Parts dimethylpinacoxysilane | 2 | 4 | 6 | 2 | 4 | 6 |
| Oven Cure: 24 hours at 250° C.: | | | | | | |
| Shore A hardness | 75 | 75 | 74 | 71 | 72 | 69 |
| Tensile strength (p. s. i.) | 512 | 609 | 658 | 562 | 708 | 780 |
| Elongation (percent) | 120 | 140 | 180 | 160 | 220 | 270 |
| Tear (p./i.) | 79 | 105 | 108 | 103 | 102 | 119 |
| Compression set | | | | | | |
| Knit time (seconds): 3 days aging | 240 | 200 | 189 | 142 | 130 | 105 |

From Tables VI and VII it is apparent that both diphenylsilanediol and dimethylcyclopinacoxysilane must be used to obtain optimum physical properties and low knit time. Depending on the particular physical properties and knit time desired, the amounts of diphenylsilanediol can most advantageously be varied from 2 to 4 parts and the dimethylcyclopinacoxysilane from 2 to 6 parts. However, I have found that desirable products can be obtained using from 2 to 6 parts of diphenylsilanediol and from 2 to 10 parts of dimethylcyclopinacoxysilane.

By this invention I have provided elastomeric materials of improved strength and other physical properties by doughmixing at elevated temperatures alkyl aryl vinyl silicone treated with silica type fillers. I have further shown that additional benefits may be obtained by the addition of dimethylcyclopinacoxysilane to the filled composition treated with diphenylsilanediol. It will be realized, of course, that silica type filler has been specifically described in the examples; other comparable fillers of this type can be substituted therefor. It will also be appreciated that while only one curing agent has been shown, other comparable agents or catalysts well known in the art, including but not limited to tertiary butyl perbenzoate, benzoyl peroxide, etc., or combinations thereof, can be utilized.

What I claim as new and desire to secure by Letters Patent of the United States is:

1. The process of improving the physical properties of cured alkyl aryl vinyl silicone having a filler comprising silica which comprises adding to the uncured and filled silicone diphenylsilanediol and mixing said uncured silicone under a shearing and smearing action at temperatures of at least 140° C.

2. The process of improving the physical properties of cured alkyl aryl vinyl silicone having a filler comprising silica which comprises adding to the uncured, filled silicone diphenylsilanediol and dimethylcyclopinacoxysilane and subjecting said uncured silicone to a shearing and smearing mixing action at temperatures of at least 140° C.

3. The process of improving the physical properties of cured alkyl aryl vinyl silicone having a filler comprising silica material which comprises adding to the uncured, filled silicone, by weight, from 2 to 6 parts of diphenylsilanediol and 2 to 10 parts of dimethylcyclopinacoxysilane per 140 parts of filled silicone and subjecting said mixture to a shearing and smearing mixing action at temperatures of at least 140° C.

4. The product produced by the process of claim 1.

5. The product produced by the process of claim 2.

References Cited in the file of this patent

UNITED STATES PATENTS

| | | |
|---|---|---|
| 2,541,137 | Warrick | Feb. 13, 1951 |
| 2,819,236 | Dickmann | Jan. 7, 1958 |

OTHER REFERENCES

Pfeifer et al.: India Rubber World, volume 129, No. 4, January 1954, pages 481–484.